United States Patent [19]

Ito et al.

[11] Patent Number: 5,521,570

[45] Date of Patent: May 28, 1996

[54] SUPERCONDUCTIVE MAGNETIC LEVITATION APPARATUS

[75] Inventors: Yoshitaka Ito; Yousuke Yanagi; Tetsuo Oka, all of Kariya, Japan

[73] Assignee: Imra Material R&D Co., Ltd., Kariya, Japan

[21] Appl. No.: 458,820

[22] Filed: Jun. 2, 1995

Related U.S. Application Data

[63] Continuation of Ser. No. 212,732, Mar. 14, 1994, abandoned.

[30] Foreign Application Priority Data

Jul. 28, 1993 [JP] Japan .................. 5-207113

[51] Int. Cl.⁶ .................. H01F 1/00; H02K 7/09; B65G 15/58; B60L 13/00
[52] U.S. Cl. .................. 335/216; 310/90.5; 198/690.1; 104/285
[58] Field of Search .................. 335/216; 310/90.5; 104/281, 282, 283, 284, 285, 286; 198/690.1, 679; 156/DIG. 62

[56] References Cited

U.S. PATENT DOCUMENTS 5,251,741  10/1993  Morishita .................. 198/690.1

FOREIGN PATENT DOCUMENTS

| 483748 | 5/1992 | European Pat. Off. | 104/281 |
| 249403 | 10/1988 | Japan | 104/281 |
| 0126307 | 1/1989 | Japan | 104/281 |
| 0186104 | 7/1989 | Japan | 104/281 |
| 1206804 | 8/1989 | Japan | 104/285 |
| 1295606 | 11/1989 | Japan | 104/281 |
| 4165902 | 6/1992 | Japan | 104/281 |
| 5336613 | 12/1993 | Japan | 104/281 |
| 5336614 | 12/1993 | Japan | 104/281 |
| 5328538 | 12/1993 | Japan | 104/283 |

OTHER PUBLICATIONS

Patent Abstracts of Japan, AN 64-52766, JP-A-2-237485, Sep. 20, 1990.
J. Appl Phys., vol. 69, No. 10, pp. 7306-7309, May 15, 1991, M. Komori, et al., "Static Levitation in a High-Tc Superconductor Tile on Magnet Arrangements".

Primary Examiner—Leo P. Picard
Assistant Examiner—Stephen T. Ryan
Attorney, Agent, or Firm—Oblon, Spivak, McClelland, Maier & Neustadt

[57] ABSTRACT

A superconductive magnetic levitation apparatus is provided which is simple in structure, low in cost and is used for readily explaining superconducting phenomena such as the Meissner effect and the pinning effect. The superconductive magnetic levitation apparatus includes a levitation moving unit 5 including superconductors 4, and a heat insulative tank 51 for storing a coolant 52 for cooling the superconductors 4; and a track 3 arranged in confronted relation with the superconductors 4 of the levitation moving unit 5, the track 3 including a number of permanent magnets 2 fixed to a ferromagnetic metal plate 1. The permanent magnets 2 are composed of a plurality of series connected magnetic pieces having the same pole in a longitudinal direction of the track 3 and a plurality of parallel connected magnetic pieces having different poles in a transverse direction of the track 3.

10 Claims, 13 Drawing Sheets

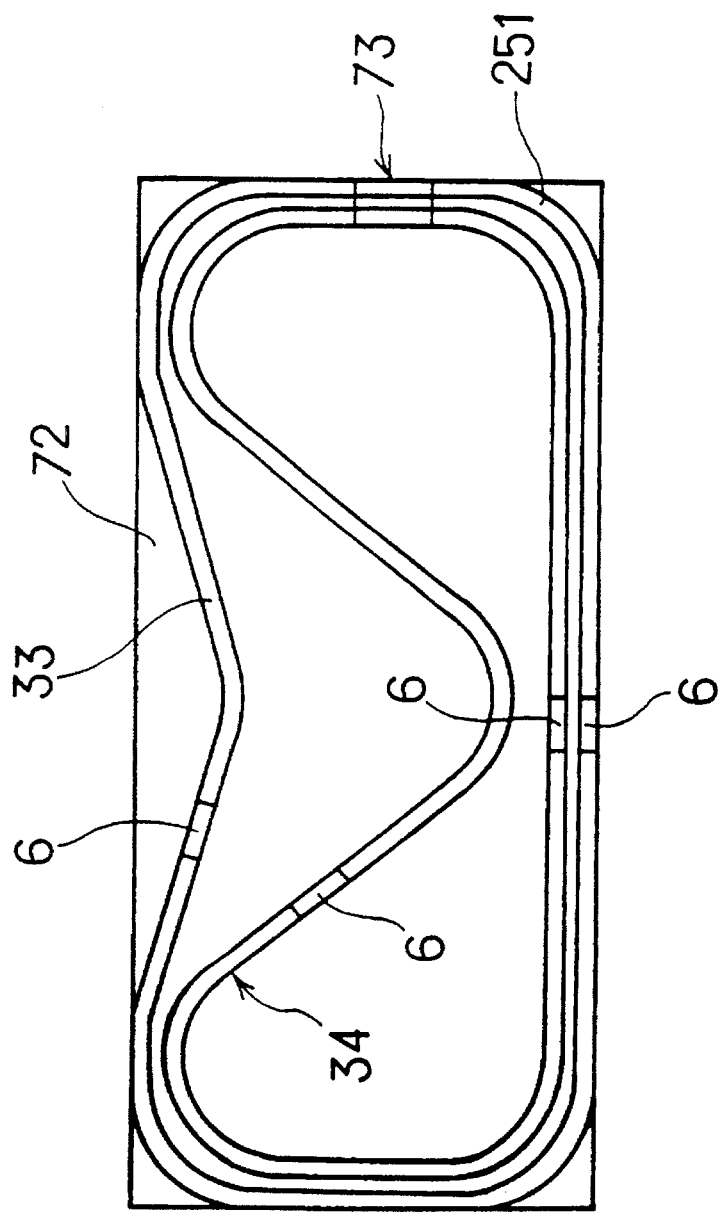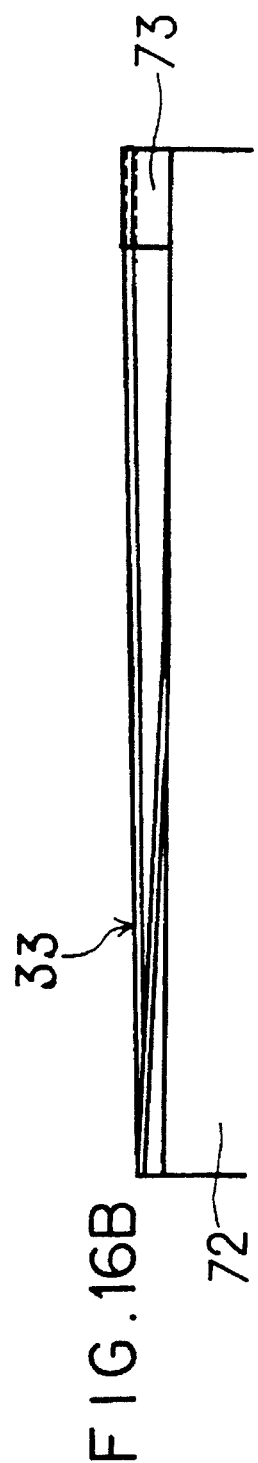
FIG. 16A
FIG. 16B

SUPERCONDUCTIVE MAGNETIC LEVITATION APPARATUS

This application is a Continuation of application Ser. No. 08/212,732, filed on Mar. 14, 1994, now abandoned.

BACKGROUND OF THE INVENTION

1. Field of the Invention

The present invention relates to a superconductive magnetic levitation apparatus.

2. Description of the Prior Art

A superconductive magnetic levitation system has lately attracted considerable attention due to the fact that the high temperature superconductor has been recently developed. Thus, various attempts have been made therefor (see Japanese Patent Laid-Open Application No. Hei 4-165902, for example).

On the other hand, these days, there has been a strong demand for teaching the superconductor technology to young people including elementary school children, junior high school students, high school students and others who have no particular scientific knowledge. However, there is no suitable teaching material which can be used to well explain phenomena such as the so-called "Meissner effect" and the "pinning effect" in the superconductor technology.

The above-described conventional superconductor is provided with a levitation moving unit having a cooling device and a superconductor, a permanent magnet for levitating the levitation moving unit, and a plurality of propelling coils for moving the levitation moving unit. With such an arrangement, the levitation moving unit is effectively levitated under an improved controllability.

The levitation principle of the levitation moving unit is the most understandable visible phenomena of the superconducting phenomena such as the Meissner effect and the pinning effect. Accordingly, in order to attain the above-described educational object, it is most desirable to adopt this system.

The conventional superconductive magnetic levitation system, however, needs a special apparatus such as coils for effectively propelling the levitation moving unit and cooling devices for effectively cooling the superconductor. Accordingly, the above-described superconductor magnetic levitation system is large in size or scale and complicated in structure.

This hinders the people, who have no particular scientific knowledge, from understanding the levitational principle of the levitation moving unit which is floating in the air. Furthermore, the cost of manufacturing the above-described superconductor magnetic levitation system is extremely high due to the increased cost of the coils and the cooling devices and the like. In particular, the total cost would largely exceed a reasonable range of teaching material for children, such as junior high school students.

SUMMARY OF THE INVENTION

Accordingly, in view of the foregoing defects inherent in the prior art system, a primary object of the present invention is to provide a superconductive magnetic levitation system which is simple in structure and low in manufacturing cost and with which it is possible to explain superconducting phenomena such as the Meissner effect and the pinning effect in an understandable manner.

According to the present invention, there is provided a superconductive magnetic levitation apparatus comprising:

a levitation moving unit including at least one superconductor, and a heat insulative tank for storing a coolant for cooling the superconductor: and a track arranged in confronted relation with the superconductor of the levitation moving unit, the track including a number of permanent magnets fixed to a ferromagnetic metal plate, the permanent magnets being composed of a plurality of series connected magnetic pieces having the same pole in a longitudinal direction of the track and a plurality of parallel connected magnetic pieces having different poles in the transverse direction of the track, wherein opposite magnetic pole plates having a pole different from a pole in the longitudinal direction of the track are partially arranged in the longitudinal direction of the track.

BRIEF DESCRIPTION OF THE DRAWINGS

In the accompanying drawings:

FIGS. 16A and 16B are a plan view and a side elevational view showing the track according to a fifth embodiment;

DETAILED DESCRIPTION OF THE INVENTION

Figure 1:
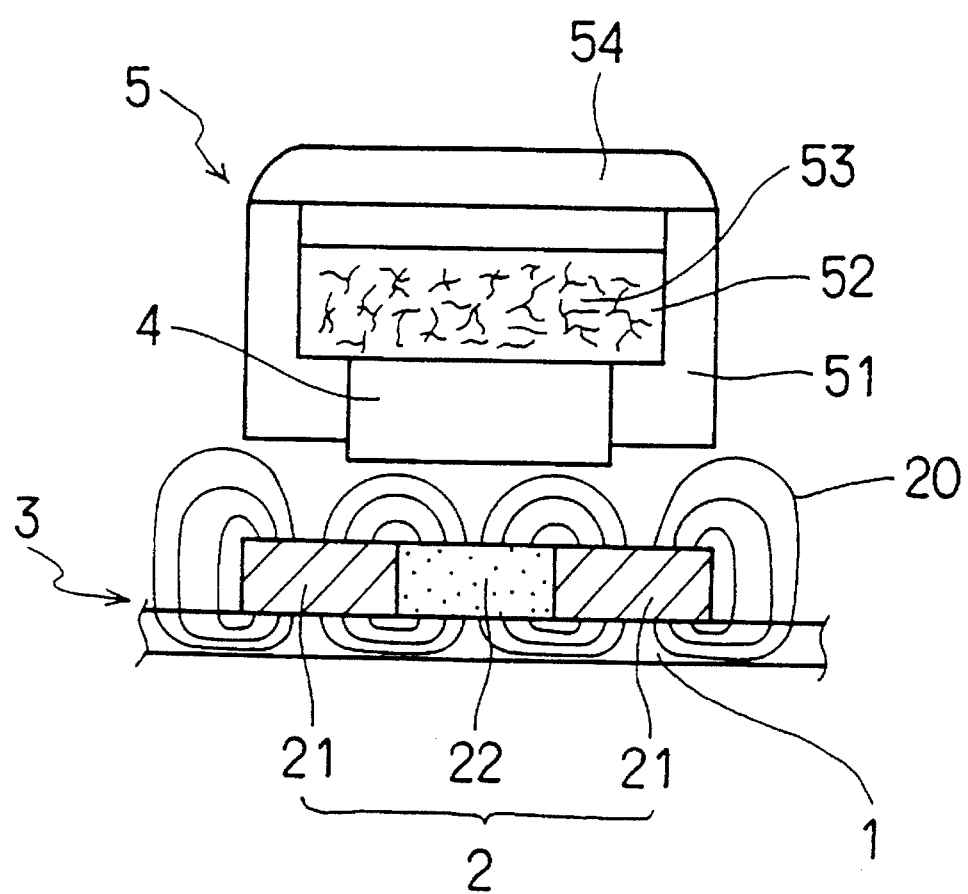
FIG. 1 is a view of a superconductive magnetic levitation apparatus for illustrating of the Meissner effect.

According to the present invention, there is provided a superconductive magnetic levitation apparatus comprising:

a levitation moving unit including at least one superconductor, and a heat insulative tank for storing a coolant for cooling the superconductor; and a track arranged in confronted relation with the superconductor of the levitation moving unit, the track including a number of permanent magnets fixed to a ferromagnetic metal plate, the permanent magnets being composed of a plurality of series connected magnetic pieces having the same pole in a longitudinal direction of the track and a plurality of parallel connected magnetic pieces having different poles in a transverse direction of the track, wherein opposite magnetic pole plates having a pole different from a pole in the longitudinal direction of the track are partially arranged in the longitudinal direction of the track.

The most characterizing feature of the invention is that opposite magnetic pole plates having a pole different from a pole in the longitudinal direction of the track are partially arranged in the longitudinal direction of the track.

The levitation moving unit is constituted by providing the superconductor on the bottom of the heat insulative tank. A bottom surface of the superconductor is located above the track and an upper surface thereof is always brought into contact with the coolant within the tank. A single superconductor element or a plurality of superconductor elements are provided for the superconductor in the levitation moving unit.

It is preferable to use, as the superconductor, a material having a pinning center in its interior. An example of such a superconductor is a YBaCuO compound. Also, it is preferable to use a melt-processing method as a forming method for the superconductor.

It is preferable to use, as the coolant, a material that has a lower temperature than the critical temperature of the superconductor. An example of such a coolant is selected among the group consisting of liquid nitrogen, liquid oxygen and liquid air.

The heat insulative tank is made of the material having a low heat conductivity. An example of the material is porous resin such as foaming polystyrol, foaming polyurethane.

The above-described track is constituted by joining a number of magnetic pieces to one surface of the ferromagnetic metal plate shaped into a predetermined track course.

The ferromagnetic metal plate which forms the track is made of material having a high permeability. Examples of the ferromagnetic material are iron plate, steel plate and the like whose chief components are Fe, Co, Ni and their alloys. It is also preferable to use the metal plate having a thickness at which a magnetic saturation is not generated.

The permanent magnet is a magnet such as a ferrite magnet, a rare earth magnet or the like.

It is preferable that the opposite magnetic pole plates arranged partially in the longitudinal direction be arranged at end portions of the track. According to this feature, the distribution direction of the magnetic flux is changed at the end portions of the track. For this reason, the magnetic flux is trapped at the pinning centers within the superconductor, so that the levitation moving unit is fixed from the lateral direction to the longitudinal direction. Accordingly, the levitation moving unit which has travelled along the track is stopped at the end portion of the track.

Therefore, the pinning effect is clearly exhibited and it is easy to notice this effect.

It is preferable that the track be arranged in a curved condition in the up-and-down direction. For instance, both ends of the track are held in a higher position and its central portion is held in a lower position.

In this case, when the levitation moving unit laid on the end portion of the track is gently pushed, the levitation moving unit takes a pendulum motion in the longitudinal direction of the track. Namely, the levitation moving unit which has travelled is stopped at both end portions of the track, and furthermore, since the end portions are the highest positions, the levitation moving unit starts to move again along the track.

The motion of the levitation moving unit exhibits a comprehensive action of the Meissner effect and the pinning effect to be described later.

It is preferable to provide a plurality of superconductor elements in the transverse direction of the track for the superconductor provided on the levitation moving unit. An amount of magnetic flux trapped by the superconductor is increased to make it possible to ensure the travel stability of the levitation moving unit.

According to the present invention, there is provided a superconductive magnetic levitation apparatus comprising:

a levitation moving unit including at least one superconductor, and a heat insulative tank for storing a coolant for cooling the superconductor; and a track arranged in confronted relation with the superconductor of the levitation moving unit, the track including a number of permanent magnets fixed to a ferromagnetic metal plate, the permanent magnets being composed of a plurality of series connected magnetic pieces having the same pole in a longitudinal direction of the track and a plurality of parallel connected magnetic pieces having different poles in a transverse direction of the track, wherein the track forms a polygonal plane in the longitudinal direction thereof, a number of series connected, trapezoidal track plates are arranged in the polygonal plane and the track plates are made of parallel arranged magnetic pieces having different poles in the transverse direction of the track.

Figure 13A:
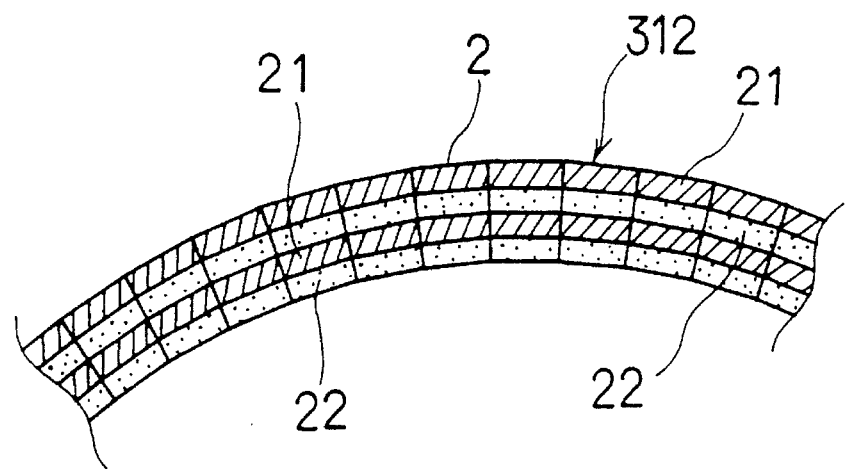
FIGS. 13A, 13B and 13C are enlarged views illustrating the track according to the third embodiment.
Figure 13B:
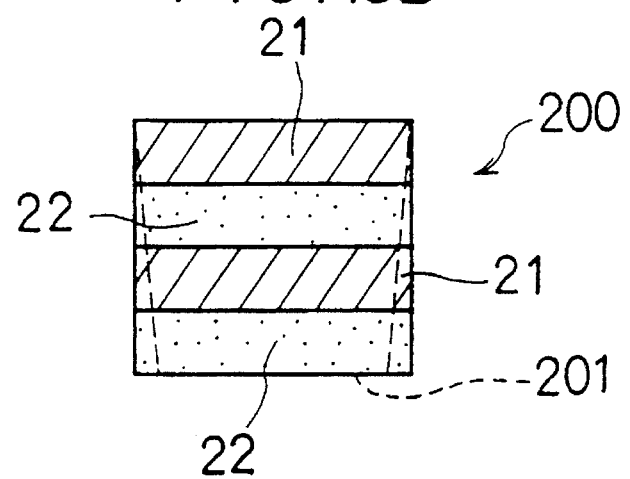
Figure 13C:
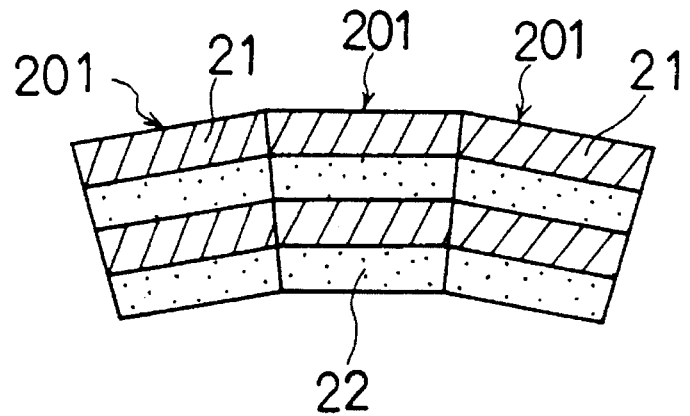

The track plates are connected in a polygonal form to constitute a polygonal curved track (FIGS. 13A, 13B and 13C).

It is preferable to use a planar metal plate for the ferromagnetic metal plate for the track.

The track preferably includes at least one loop. With this loop, the levitation moving unit continues to travel endlessly along the track. A plurality of loops may be used for the tracks.

It is preferable that the track be arranged in an endless manner and a cross portion be provided in a midway of the track. According to this feature, when the levitation moving unit travels along the cross track, the levitation moving unit exhibits the phenomenon such as up-and-down movement against the turbulence of the magnetic flux, and hence, it is possible to confirm the state where the magnetic flux is trapped by the pinning centers of the superconductor.

Figure 15A:
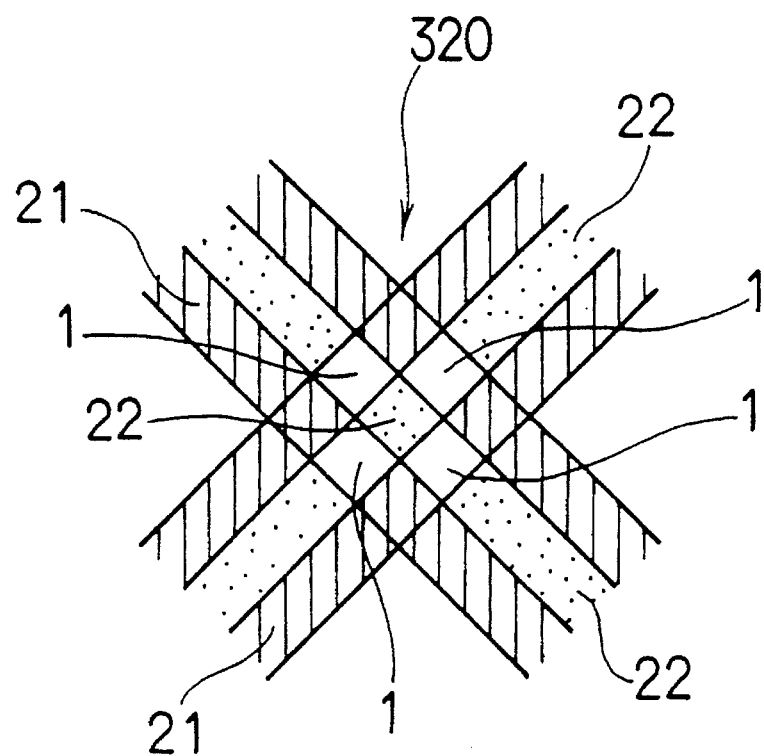
FIGS. 15A and 15B are enlarged views showing cross portions of the track of the fourth embodiment.
Figure 15B:
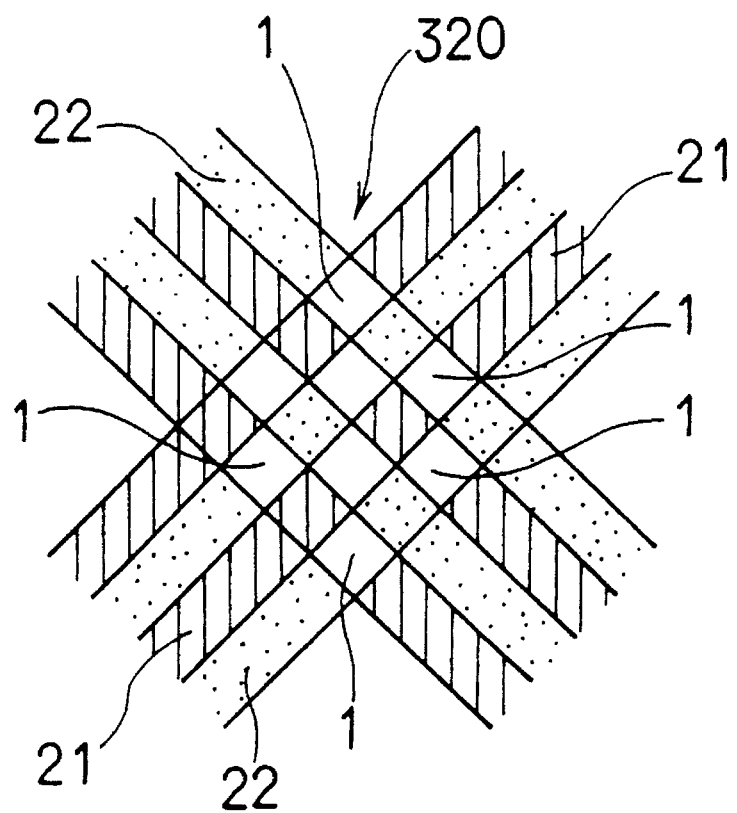
Figure 17:
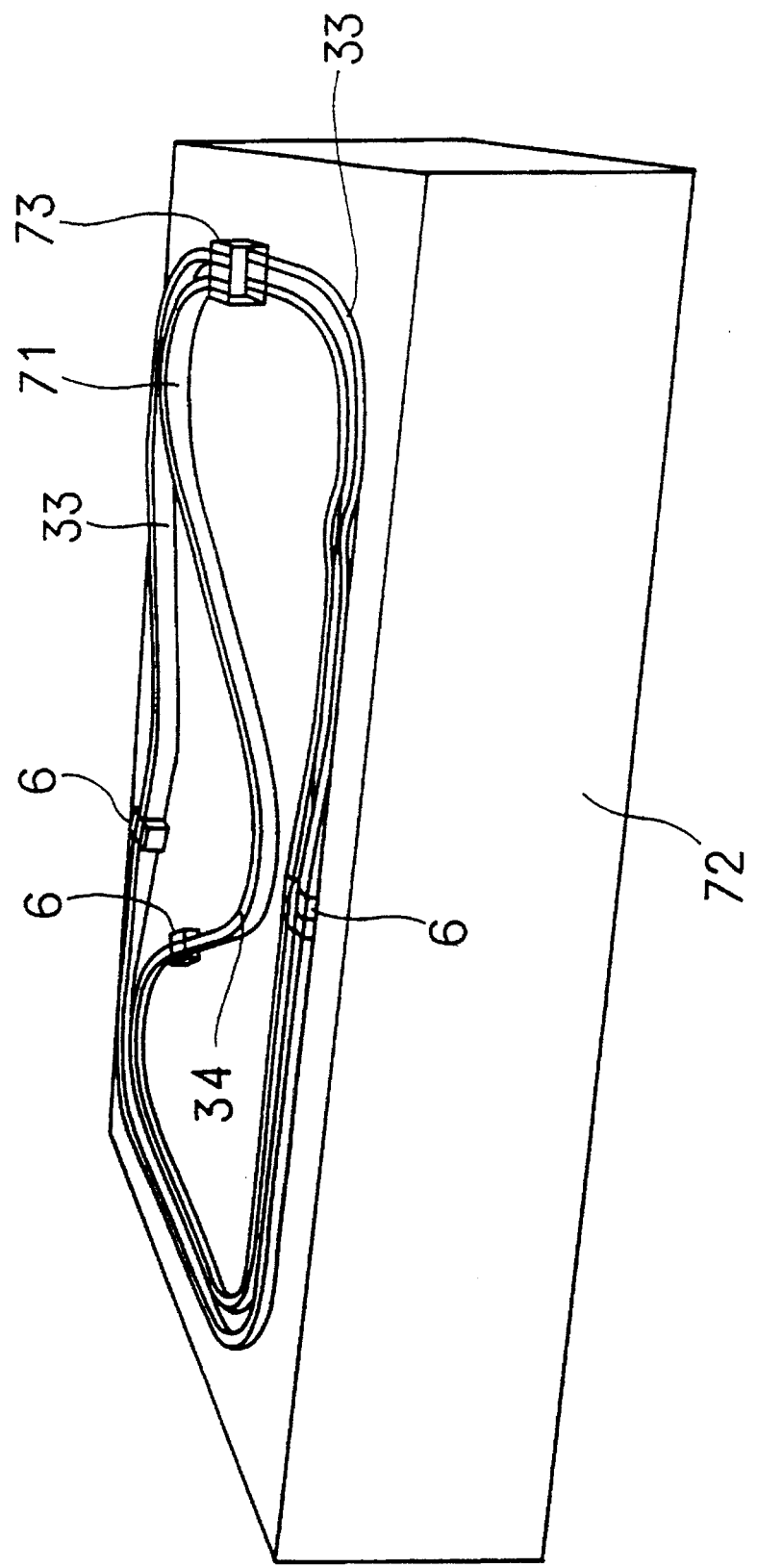
FIG. 17 is a perspective view showing the track according to the fifth embodiment.

It is preferable that a portion of the cross portion where magnetic pieces having poles different from each other are overlapped with each other have a blank space. Namely, in the cross portion of the tracks, one of the magnetic pieces is removed at the overlapped portion of the different poles (FIGS. 15A and 15B).

Accordingly, at the positions, the ferromagnetic metal plates are exposed. Also, the portions may be filled up by the metal plates or the like to flatten the cross portion.

According to another aspect of the invention, there is provided a superconductive magnetic levitation apparatus comprising:

a levitation moving unit including at least one superconductor, and a heat insulative tank for storing a coolant for cooling the superconductor; and a track arranged in confronted relation with the superconductor of the levitation moving unit, the track including a number of permanent magnets fixed to a ferromagnetic metal plate, the permanent magnets being composed of a plurality of series connected magnetic pieces having the same pole in a longitudinal direction of the track and a plurality of parallel connected magnetic pieces having different poles in a transverse direction of the track, wherein the track has at least one stop/start portion on it, and the stop/start portion is composed of a non-magnetic plate provided on the track and a permanent magnet arranged below the non-magnetic plate in the manner where it can move up and down.

It is preferable to provide the stop/start portion to the gradient portion or sloped portion of the track. With this structure, when the levitation moving unit that has stopped is again started, it is possible to utilize a gravitational force. Incidentally, it is possible to provide the start/stop portion in the flat portion.

It is preferable that the thickness of the non-magnetic plate be equal to or less than a height of levitation of the levitation moving unit.

It is preferable that the non-magnetic plate be long enough to stop the levitation moving unit which has travelled, by the frictional force, and the non-magnetic plate is longer than that of the permanent magnet which is provided in the manner where it can move up and down. This is because when the permanent magnet is lowered, any gap in the track should be prevented from occurring.

It is preferable to provide a plurality of the stop/start portions. According to the plural stop/start portions, it is convenient to actually exhibit and show the pinning effect to a large number of observers at different locations.

It is preferable that the heat insulative tank contain an absorbent for absorbing the coolant. By this, it is possible to prevent the coolant from overflowing when the levitation moving unit travels somewhat unstably as the levitation unit travels along the curved track.

In the superconductive magnetic levitation apparatus according to the invention, the track is formed by fixing the permanent magnets to the ferromagnetic metal plate. For this reason, the magnetic flux generated in the permanent magnet is distributed in the air while forming arcuate lines above the upper portion of the permanent magnets and within an interior of the ferromagnetic metal plate below the permanent magnet as shown in FIG. 1.

The superconductor provided in the levitation moving unit is always cooled below the critical temperature under the superconductive state by the coolant within the heat insulative tank. Then, the material which is kept under the superconductive condition has a perfect diamagnetic characteristic to keep its interior under a zero magnetic flux condition. This is the Meissner effect.

Accordingly, when the above-described levitation moving unit is gently laid on the track, the superconductor is repulsive against the magnetic flux on the track to the outside and the levitation unit is levitated as shown in FIG. 1 and as described later. Accordingly, it is possible to visually confirm the Meissner effect.

Also, since the magnetic flux density is increased in proportion to magnetic permeability and an intensity of the magnetic field, the track formed by providing the permanent magnet to the ferromagnetic member having high magnetic permeability to thereby make it possible to increase the levitation height.

When the magnetic field having an intensity exceeding predetermined level is applied to the ferromagnetic member, the magnetic saturation occurs. Therefore, there is a fear that a phenomenon would happen in which the levitation height would be low although a magnetic intensity of the permanent magnet would be high. In order to prevent this, a ferromagnetic material having a large thickness is used. Thus, since the volume of the ferromagnetic material is increased, the magnetic field required to reach the magnetic saturation is increased.

Figure 2:
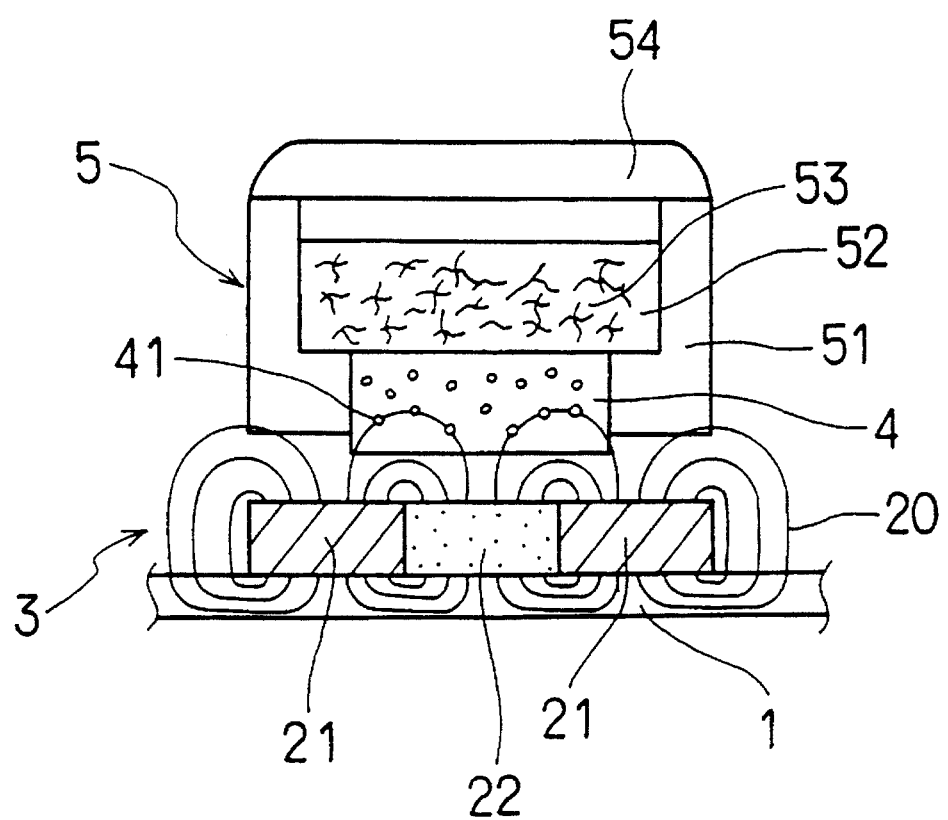
FIG. 2 is a view of a superconductive magnetic levitation apparatus for illustrating of the pinning effect.
Figure 3:
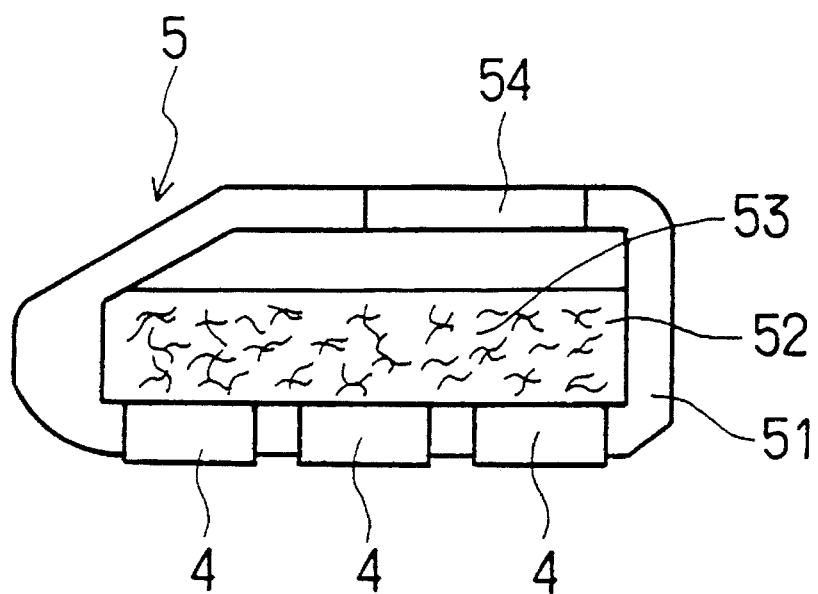
FIG. 3 is a cross-sectional view showing a levitation moving unit according to the first embodiment of the invention.
Figure 4:
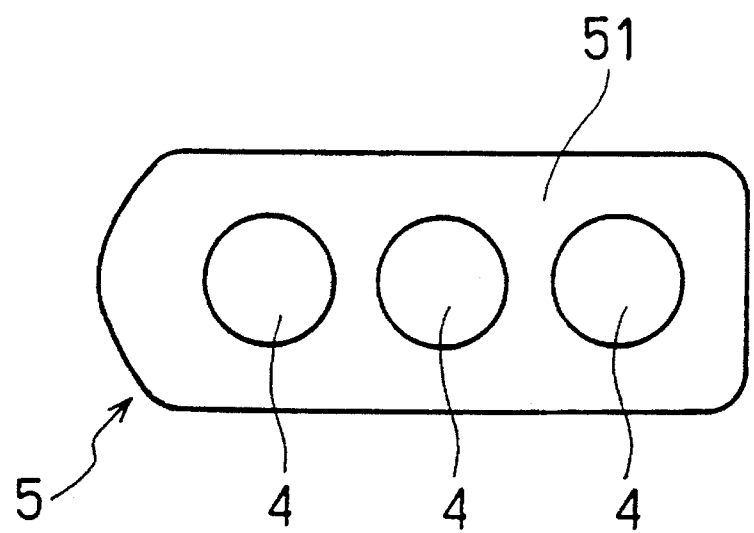
FIG. 4 is a bottom view showing the levitation moving unit according to the first embodiment of the invention.

Subsequently, when a large force is applied from above to the levitation moving unit levitated above the track to thereby cause the levitation moving unit to be depressed against the track, the magnetic flux is trapped by the pinning centers within the superconductor interior. This is referred to as pinning effect. This state is illustrated in FIG. 2 to be described later. Due to this pinning effect, a large return force is applied to the superconductor in directions except for the distribution direction of the trapped magnetic flux.

More specifically, the levitation moving unit travels without deviation from the track while the levitation moving unit is being levitated in the longitudinal direction of the track. In order to move the levitation moving unit in directions such as upper, lower, left and right directions other than the magnetic flux distribution direction, a force needed for deviating from the pinning centers has to be given. As a result, the levitation moving unit travels along the track without deviating from the track by the above-described levitation moving unit.

Also, in the case where the opposite magnetic pole plate which is different in polarity is arranged in a part of the track, the magnetic flux distribution direction is changed at this portion, so that the levitation moving unit is stopped thereat without touching the magnet track.

Also, in the case where the track is in the polygonal shape, the magnetic flux distribution direction is somewhat changed at the joints of the trapezoidal track plates. For this reason, the levitation moving unit travels while swinging its rear portion in the right and left directions by the above-described pinning effect.

Also, in the case where the stop/start portion is provided on the track as mentioned before, the levitation moving unit is stopped while being offset in a different direction than the advancing direction. It is however noted that the magnetic flux of the track is trapped by the superconductor. For this reason, in a restart operation in which the permanent magnet in the stop/start portion is caused to approach toward the superconductor, the levitation moving unit is levitated and moved after the direction of the levitation moving unit has been changed again to the advancing direction.

The above-described travelling condition of the levitation moving unit well expresses the pinning effect.

Accordingly, it is possible for the observers to observe the travelling state of the levitation moving unit and to touch it to confirm the pinning effect.

The levitation moving unit of the superconductive magnetic levitation apparatus according to the present invention is composed of the superconductors and the heat insulative tank and is simple in structure.

Also, for instance, the insulative tank of the levitation moving unit may be made of foaming polystyrol, the absorbing material may be absorbent cotton, the ferromagnetic metal plate of the track may be made of a iron plate and the permanent magnet may be a ferrite magnet. These materials are available on the market. Thus, according to the invention, it is possible to reduce the cost of the apparatus.

As described above, the apparatus according to the invention is suitable for educational material that can be used to well explain the superconducting phenomena such as the pinning effect. The apparatus according to the invention may readily be exhibited and actually operated in schools, corporations, exhibitions, shows or the like for educational purposes and propagation of the superconducting phenomena and use thereof. Furthermore, by positively utilizing these phenomena, it is possible to apply the superconductor to an amusement car for children and adults in leisure lands and parks. Through such an experience, they will become more familiar with the superconducting phenomena and their interests therein will grow. This would be contributable to the further development of the superconductor application technology.

As described above, according to the present invention, it is possible to provide a superconductive magnetic levitation apparatus which is simple in structure, low in cost and can be used to well explain the superconducting phenomena such as the Meissner effect and the pinning effect.

DESCRIPTION OF THE PREFERRED EMBODIMENTS

Embodiments of the present invention will now be described with the accompanying drawings.

Embodiment 1

A superconductive magnetic levitation apparatus according to the present invention will be explained with FIGS. 1 through 6.

In the superconductive magnetic levitation apparatus according to the embodiment, a levitation moving unit 5 which is modeled on a railroad train is adapted to run on a track 3.

As shown in FIGS. 1 to 4, the levitation moving unit 5 of the superconductive magnetic levitation apparatus according to the embodiment is composed of superconductors 4, a coolant 52 for cooling the superconductors 4, an absorbent 53 for retaining the coolant and a heat insulative tank 51 having a lid 54.

The superconductors 4 are $Y_{2.33}Ba_{2.67}Cu_{3.67}O_{10.33}-\delta$ which is produced through a melt-processing method. The three superconductors each of which is shaped into a disk having a diameter of 17 mm and a thickness of 8 mm are connected in series with one another in the advancing direction of the levitation moving unit 5 on a bottom of the heat insulative tank 51 made of foaming polystyrol (see FIGS. 3 and 4). The absorbent 53 is made of absorbent cotton and the coolant 52 is made of liquid nitrogen.

Figure 5:
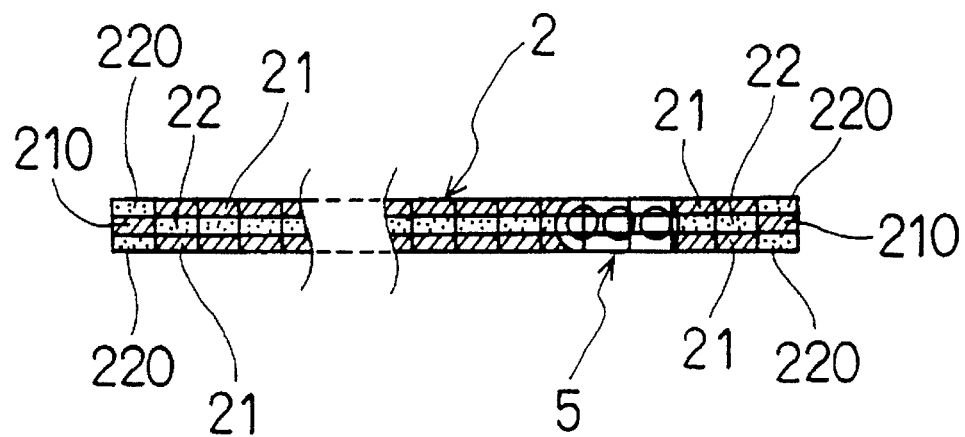
FIG. 5 is an illustration of the track according to the first embodiment.

As shown in FIGS. 1, 2 and 5, the track 3 is made of a ferromagnetic metal plate 1 and permanent magnets 2 attached thereto. The ferromagnetic metal plate 1 is made of a nickel plated iron plate in the form of a rectangular shape that is 1,000 mm long, 36 mm wide and 1.5 mm thick. Each of the permanent magnets 2 is made of a ferrite magnet that is 40 mm long, 12 mm wide and 8 mm thick.

The above-mentioned components are assembled to form the track 3 as follows:

Namely, as shown in FIGS. 1, 2 and 5, the above-described permanent magnets 2 are attached to the metal plate 1 without any gaps between the magnets, so that 25 magnets are arranged in the longitudinal direction of the track 3 and 3 magnets are arranged in the transverse direction thereof. In this case, the permanent magnets 2 adjacent to each other in the transverse direction are attached to the metal plate 1 with their N-pole 21, S-pole 22 and N-pole 21 being directed upwardly in order.

Figure 6:
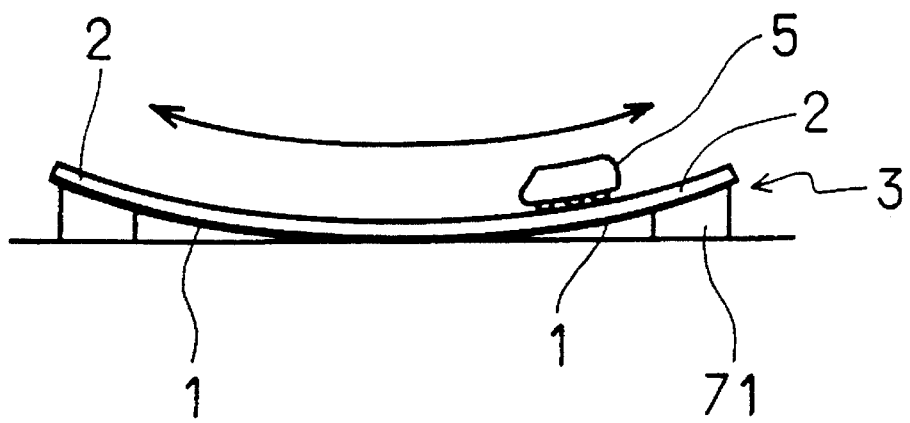
FIG. 6 is a side elevational view showing the track according to the first embodiment.

It is however noted that, in order to provide opposite magnetic pole plates whose polarity is different from that of the track 3 in the longitudinal direction at either end portion of the track 3, the magnetic pole plates are attached to the metal plate 1 in order of S-pole opposite pole plate 220, N-pole opposite pole plate 210 and S-pole opposite pole plate 220 as shown in FIG. 5. Also, as shown in FIG. 6, posts 71 are provided under both ends of the track 3 so that the track 3 is curved in the up-and-down direction with both ends elevated and the central portion lowered.

The operation of the thus arranged apparatus will be explained.

First of all, as shown in FIGS. 1 and 5, the levitation moving unit 5 is gently laid on a central portion of the track 3 so that a center of the superconductors 4 of the levitation unit 5 is aligned with a center of the track 3. In this case, the levitation moving unit 5 is levitated by about 5 mm away from the track 3.

More specifically, the superconductors 4 are always cooled at a temperature equal to or lower than the critical temperature by the liquid nitrogen in the heat insulative tank 51 so that they are kept under the superconductive state. Accordingly, when the levitation moving unit 5 is gently laid on the track 3, the superconductors 4 are repulsive against magnetic flux 20 which is generated by the permanent magnets 2 of the track 3. As a result, the levitation moving unit 5 is levitated above the track 3 (see FIG. 1).

Thus, it is possible to visually confirm the Meissner effect by the above-described operation.

Subsequently, when the levitation moving unit 5 is manually forcibly pushed to the track 3 against the levitation force, a height from the track 3 will be approximately 3 mm. This is because the magnetic flux 20 is trapped at pinning centers 41 in an interior of each superconductor 4. Under this condition, when the levitation moving unit 5 is lifted, it is possible to confirm that a vertical force is applied to the track 3.

Furthermore, when the levitation moving unit 5 is manually pushed from the central portion to one end portion of the track 3 in the longitudinal direction of the track 3, the unit 5 is moved as desired around the central portion but is stopped at the end portion, just as hitching on something while levitating above the track 3. When the levitation moving unit 5 is lightly pushed at the end portion toward the central portion of the track 3, the levitation moving unit is moved downwardly without deviating from the track 3 and then is raised toward the other end portion of the track 3, where it is stopped. Thus, it is possible to move the levitation moving unit 5 in a reciprocating manner.

This is because the magnetic flux 20 is trapped by the pinning centers 41 in the interior of each of the superconductors 4 of the levitation moving unit 5 and a strong return force is applied to the superconductors 4 in directions except for a distribution direction of the magnetic flux 20 trapped. Moreover, the magnetic field distribution is changed at both end portions of the track 3 so that the magnetic flux having a different direction sticks to the pinning centers 41 in the interior of the superconductor 4 and the levitation moving unit 5 (FIG. 5) is stopped.

Thus, it is possible to confirm the pinning effect by the above-described series operations.

Also, the above-described operations are easy for people such as elementary school children. Accordingly, the apparatus according to this embodiment is suitable as an educational material for readily explaining the superconductive phenomena such as the Meissner effect and the pinning effect.

Furthermore, the parts which constitute the apparatus of the embodiment are made of inexpensive material and are simple in structure to reduce the manufacturing cost therefor.

According to the embodiment of the invention, it is thus possible to provide a superconductive magnetic levitation apparatus which is simple in structure, low in cost and can be used to readily explain the superconductive phenomena such as the Meissner effect and the pinning effect.

Embodiment 2

A second embodiment of the invention is directed to an apparatus in which additional superconductors 4 are added to the levitation moving unit 5 as shown in FIGS. 7 to 11.

Figure 7:
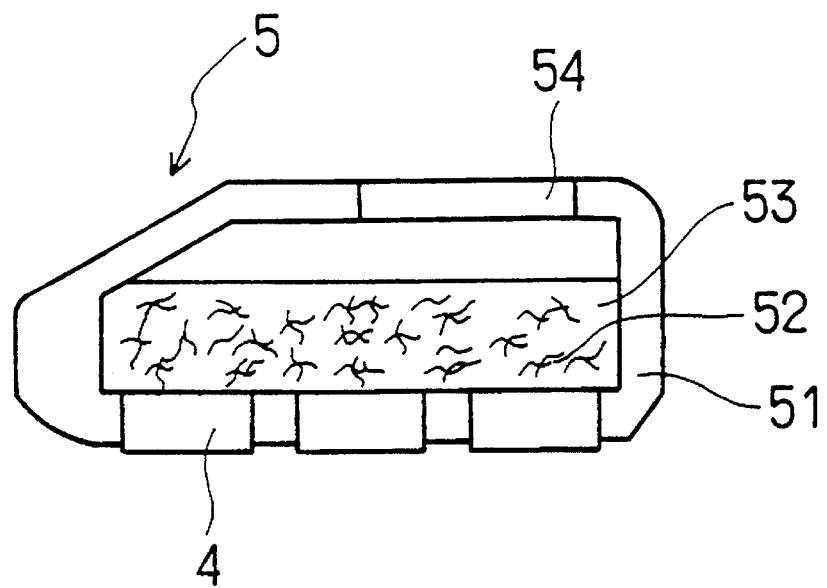
FIG. 7 is a cross-sectional view showing the levitation moving unit according to the second embodiment of the invention.
Figure 8:
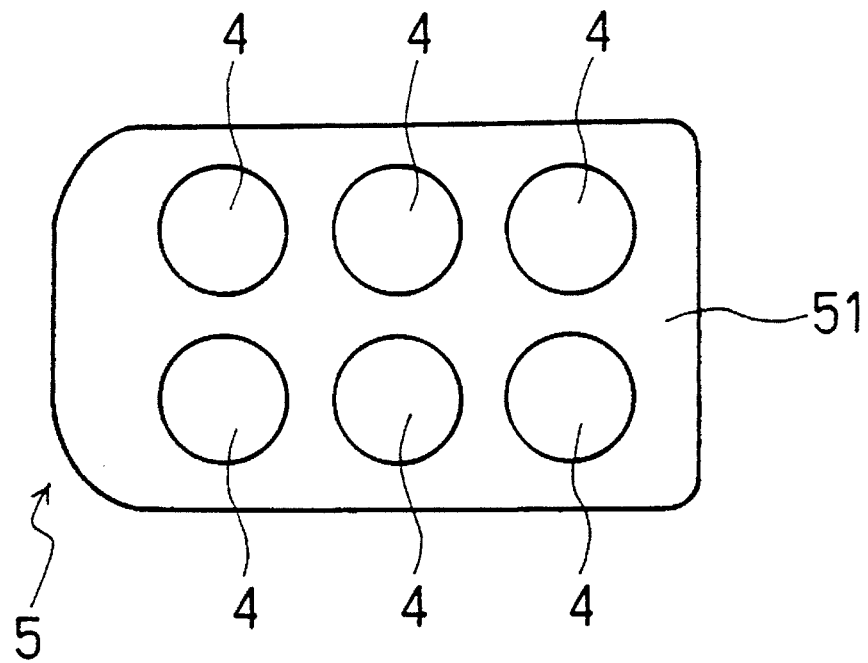
FIG. 8 is a bottom view showing the levitation moving unit according to the second embodiment of the invention.

Namely, as shown in FIGS. 7 and 8, the number of the superconductors 4 of the levitation moving unit 5 in the longitudinal direction in the track 3 is three and the number of the superconductors 4 of the unit 5 in the lateral direction is two.

Figure 9:
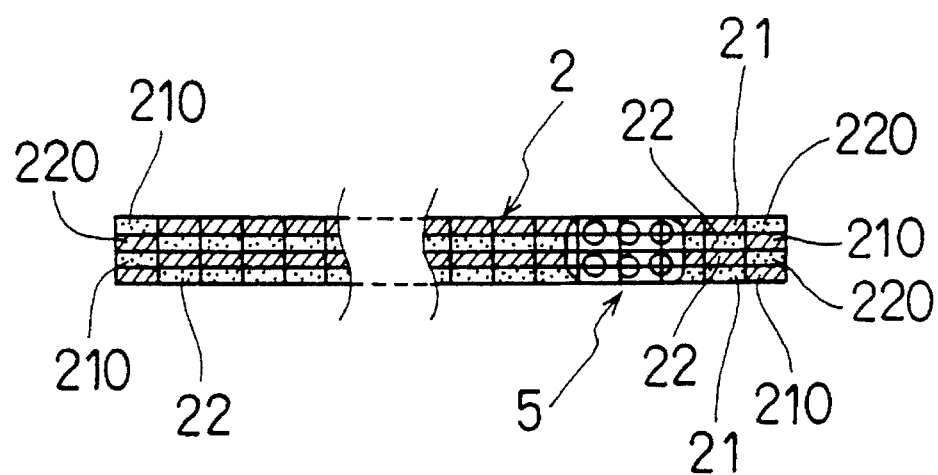
FIG. 9 is an illustration of the track according to the second embodiment.
Figure 10:
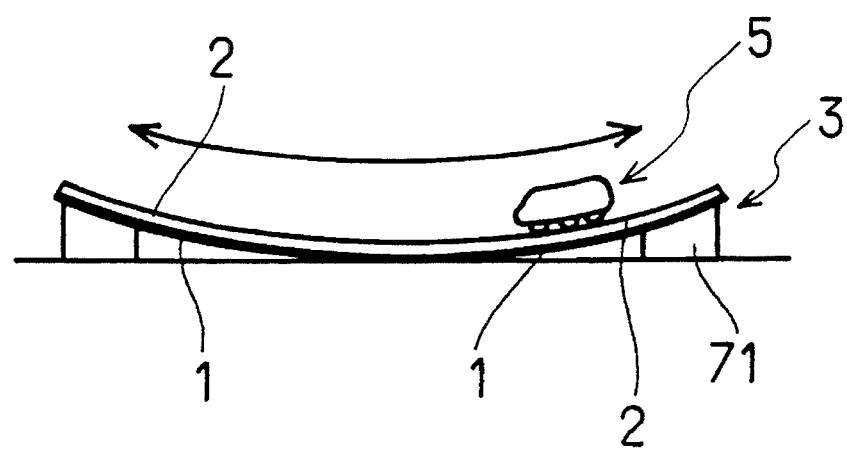
FIG. 10 is a side elevational view showing the track according to the second embodiment.

Corresponding to the increment of the superconductors 4, the number of the permanent magnets 2 in the lateral direction of the track 3 is increased from three to four as shown in FIG. 9.

The other structure is the same as that of the first embodiment.

The operation of the second embodiment will now be described.

When the levitation moving unit 5 according to the second embodiment is gently laid on a central portion of the track 3, the unit 5 is raised by about 8 mm. When the unit 5 is pressed strongly thereto, the unit 5 is levitated only up to about 3 mm due to the pinning effect. A force which is needed for moving the unit 5 laterally or for separating the unit 5 away from the track 3 is greater than that in case of the first embodiment.

Figure 11:
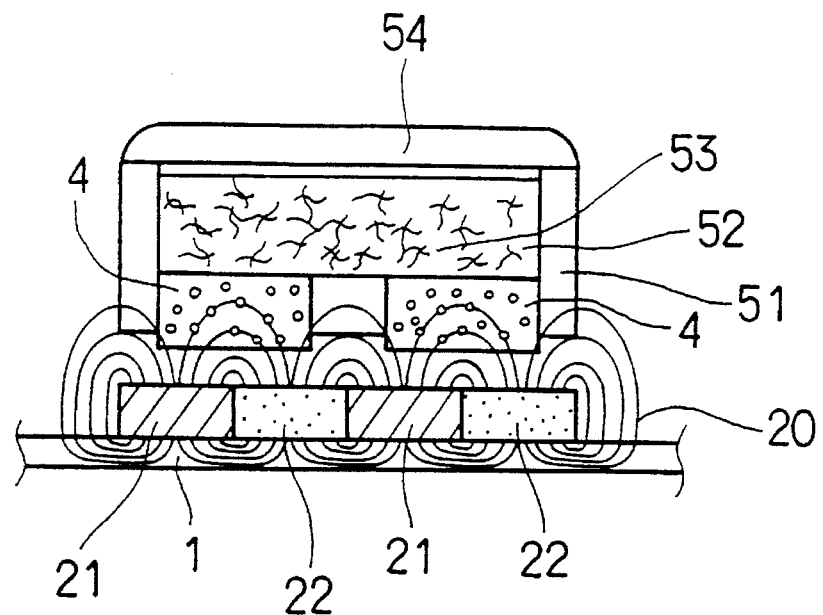
FIG. 11 is an illustration of the levitation moving unit according to the second embodiment of the invention.

Since the widths of the superconductors 4 and the permanent magnets 2 are increased in the lateral direction according to the second embodiment, as shown in FIG. 11, a greater amount of magnetic flux 20 is trapped by the superconductors 4 so that the unit 5 is more firmly fixed along the track 3. Accordingly, the levitation balance is enhanced and a stable travel of the levitation moving unit 5 is ensured.

There would be therefore no fear that the levitation moving unit 5 would be slanted during its travel and the liquid nitrogen or the like would overflow from the tank 51. This contributes to a safety aspect. Therefore, the apparatus according to the second embodiment is particularly suitable for an educational material for grade school children.

Except for the features that have been just described above, it is apparent that the advantages of the second embodiment are the same as those of the first embodiment.

Embodiment 3

Figure 12:
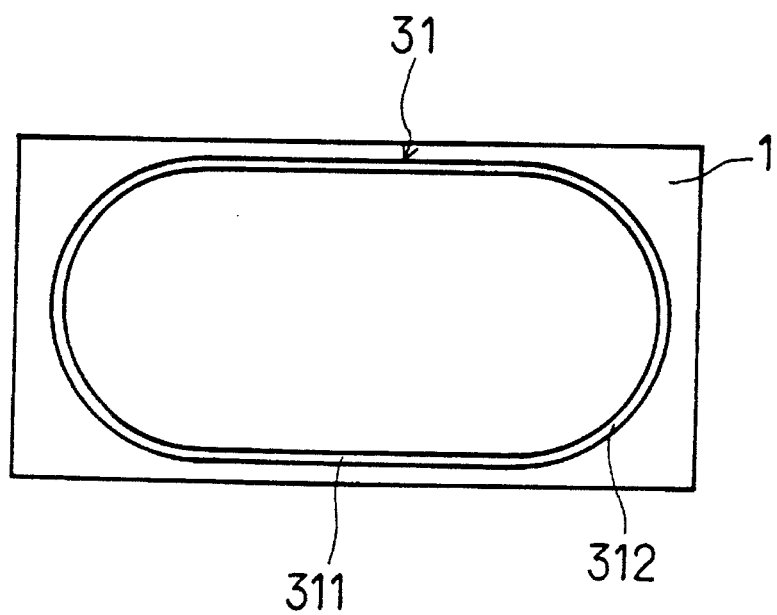
FIG. 12 is a plan view showing the track according to a third embodiment.

A third embodiment of the invention is directed to an apparatus in which the track 3 is in the form of a curved shape like a race track as shown in FIGS. 12 and 13.

The "racetrack" 31 is formed by attaching ferrite magnets (permanent magnets 2) to a planar nickel plated iron plate (ferromagnetic metal plate 1). The ferrite magnets are each dimensioned with linear portions 311 being 800 mm long and a radius of curvature of curved portions 312 being 400 mm. The nickel plated iron plate is made of four plates each being 450 mm long, 900 mm wide and 3 mm thick so that it may become 1,800 mm long, 900 mm wide and 3 mm thick.

FIG. 13A is an enlarged view showing the curved portion 312. As shown in FIG. 13A, the curved portion 312 actually has a polygonal shape.

The curved portions 312 are each formed by trapezoidal track plates 201 connected in series with one another as shown in FIGS. 13B and 13C. In producing the trapezoidal track plates 201, first of all, as shown by solid lines in FIG. 13B, four ferrite magnets each having the same shape as that of the first embodiment are attached to each other with the N-poles 21 and S-poles 22 alternatively adjacent to each other, to form a rectangular track plate 200 which is 40 mm long, 48 mm wide and 8 mm thick.

Subsequently, the rectangular track plate 200 is cut as indicated by dotted lines in FIG. 13B, to obtain a trapezoidal track plate 201. A plurality of trapezoidal track plates 201 are joined with each other to form the polygonal curved portion 312.

The other structure is the same as that of the first and second embodiments.

The operation of the third embodiment will be explained

First of all, the levitation moving unit 5 is pressed against the linear portion 311 of the racetrack 31 to be levitated. Subsequently, when the levitation moving unit 5 is pushed in the longitudinal direction of the track 31, the unit 5 starts to travel and continues to travel in an endless manner without deviation from the track 31 composed of the linear portions 311 and the curved portions 312.

In particular, it should be noted that the curved portions 312 are in the form of a polygon, and hence this is reflected so that the magnetic flux is changed discontinuously at the joints. The levitation moving unit 5 travels with its rear portion swinging right and left due to the pinning effect. The situation where the magnetic flux is trapped is more comprehensively visible along the curved portions 312 than along the linear portions 311. Accordingly, in this embodiment, the pinning effect is more visibly confirmed.

Furthermore, the running condition of the levitation moving unit 5 is similar to a running mouse. Therefore, the running condition would be attractive to the emotion of the operator or observer. Thus, the apparatus of this embodiment is most suitable for the educational material, in particular, for grade school children.

The other advantages are the same as those of the first and second embodiments.

Embodiment 4

Figure 14:
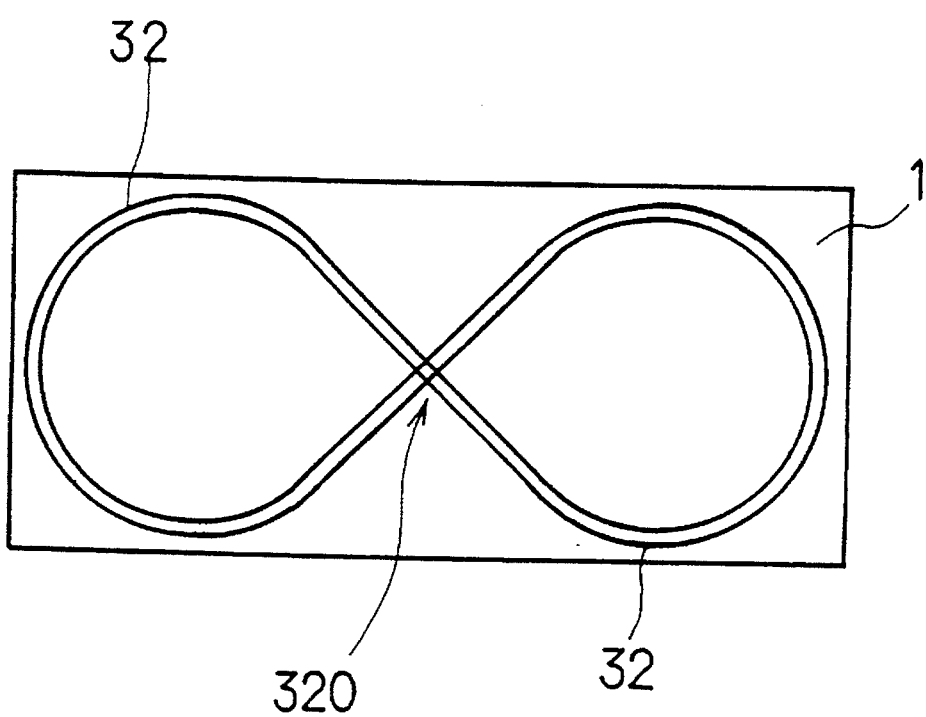
FIG. 14 is a plan view showing the track according to a fourth embodiment.

A fourth embodiment is directed to a case where the track is crossed on the same plane to form an 8-shaped track 32, as shown in FIGS. 14 and 15.

As shown in FIGS. 15A and 15B, in the cross portion 320 of the 8-shaped track 32, permanent magnets are removed from portions where the opposite poles of the permanent magnets are overlapped with each other, to thereby expose the underside metal plate 1. FIGS. 15A and 15B show the arrangements of three rows and four rows of the permanent magnets in the transverse direction of the track 32, respectively.

The other structure is the same as that of the first embodiment.

The advantage of the fourth embodiment will now be described.

Namely, in the 8-shaped track 32 of the fourth embodiment, the permanent magnets of -N poles 21 and S-poles 22 are arranged in the cross portion 320 in the arrangement shown in FIG. 15A or 15B. The permanent magnets have been removed from the portions where both the poles are overlapped with each other. For this reason, the levitation moving unit 5 smoothly travels in either direction at the cross portion 320. Accordingly, in the fourth embodiment, the pinning effect is visually shown and at the same time, the observer's interest would be enhanced.

Also, if the metal plate 1 is not exposed and either N-pole 21 or S-pole 22 of the permanent magnet is continuously arranged in the cross portion 320 in an obliquely upward or downward direction in FIGS. 15A and 15B, the distribution direction of the magnetic flux would be more turbulent than that of the fourth embodiment.

In this case, the levitation moving unit 5 would travel turbulently in the direction in which the permanent magnets are arranged discontinuously.

However, also in this case, it is possible to confirm the pinning effect by this turbulent travel.

Thus, the 8-shaped track 32 is convenient for demonstrating the pinning effect.

The other effects are the same as those of the first embodiment.

Embodiment 5

A fifth embodiment is directed to the arrangement in which two track courses 33 and 34 having the same length are formed on a table 72 as shown in FIGS. 16A, 16B, 17 and 18. In the track 33 (the following explanation will be applied equally to track 34), there are formed slopes, stop/start portions 6 and a lift 73. In the position of the lift 73, the level is kept at the highest position of the track 33 and at the same time, the level is kept at the lowest position through one-round of travel.

In the same manner as in the first embodiment, the track 33 is formed on the table 72 which is 340 cm long and 150 cm wide. The gradient of 1 cm/1 m is applied to the track 33.

Figure 18:
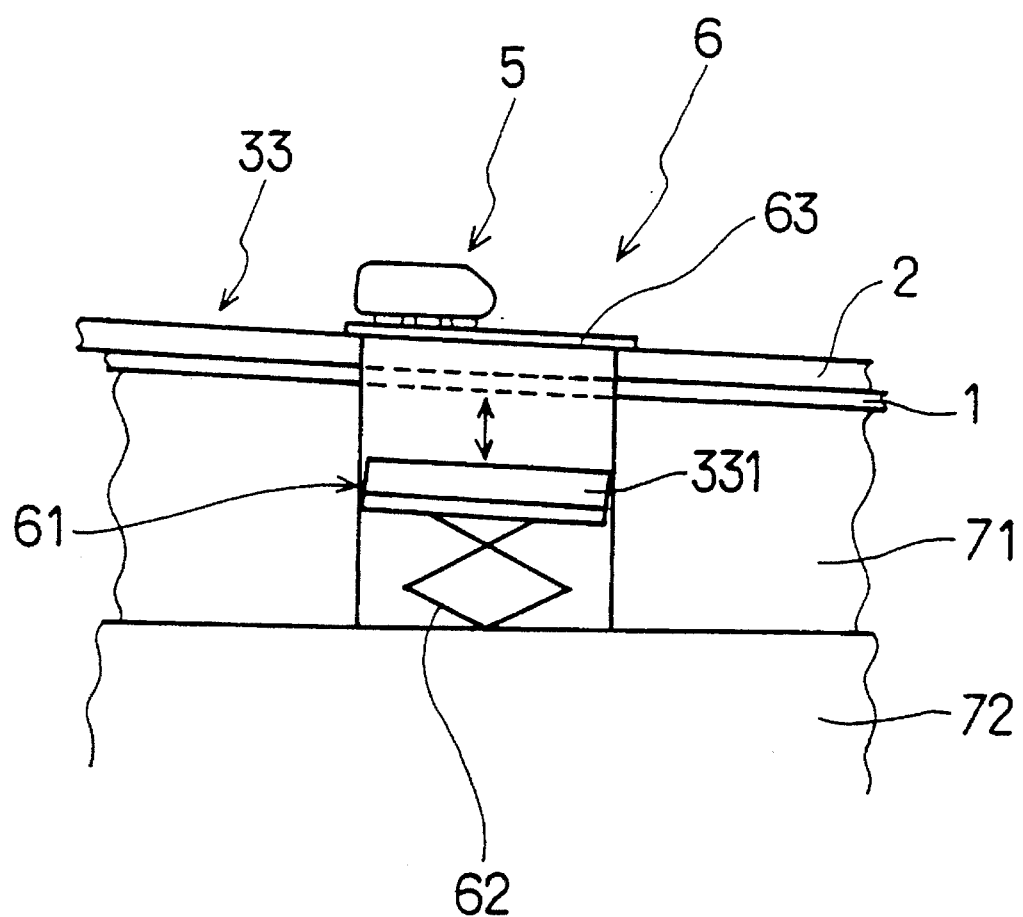
FIG. 18 is a view showing the structure of a stop/start portion according to the fifth embodiment.

The stop/start portions 6 having the structure shown in FIG. 18 are provided in places on the track 33. The stop/start portions 6 are each provided with a track movable portion 61, an elevating device 62 and a non-magnetic plate 63 laid to bridge the track movable portion 61. The track movable portion 61 is formed by cutting a part of the track 33 and providing the elevating device 62 under the cut part. The track movable portion 61 is movable, as desired, up and down as indicated by a two-headed arrow in FIG. 18.

A permanent magnet 331 which is substantially the same as the track 33 is provided on the elevating device 62.

The elevating device 62 is a motor-driven jack or lift.

The thickness of the non-magnetic plate 63 is equal to or less than a height of the levitation moving unit 5 being levitated. A length of the non-magnetic plate 63 is longer than that of the track movable portion 61 and is long enough so that the levitation moving unit 5 that has travelled above the plate may be laid thereon and stopped by friction. In the fifth embodiment, the non-magnetic plate 63 is made of an acrylic plate which is 20 cm long, 5 cm wide and 1 mm thick.

The other structure is the same as that of the first embodiment.

The advantage of the fifth embodiment will now be described.

In this embodiment, the gradient is applied to the track 33. For this reason, when the levitation moving unit 5 travels by the gravitational force, the unit 5 starts from the highest level of the track 33 (i.e., at the position of the lift 73) and returns back to the lowest position through one round. Furthermore, the levitation moving unit 5 which has travelled through one round is lifted by the lift 73 to continue the travel.

Thus, it is possible for two levitation moving units 5 to simultaneously travel along the different tracks 33 and 34. Thus, an amusement game factor is introduced into the educational apparatus for enjoyment of learning the science.

The stop/start portions 6 provided in places on the track 33 are used to once stop the travelling levitation unit 5 and again start it.

The stop/start portions 6 will operate as follows.

It should be first noted that the track movable portion 61 is provided on a sloped track.

In the case where the track movable portion 61 is lowered by the elevating device 62, the magnetic flux density is low at the portion corresponding to the stop/start portion 6. For this reason, the levitation moving unit 5 can not keep the levitation height and drops onto the non-magnetic plate 63.

Subsequently, when the track movable portion 61 is raised to the height of the upstream and downstream tracks 33 by the elevating device 62, the levitation moving unit 5 is again levitated by the permanent magnet 331 on the track movable portion 61. Since the gradient is applied to this portion, the levitation moving unit 5 again starts to travel.

Also, at the stop/start portion 6, the levitation moving unit 5 is stopped while being deviated from the advancing direction. However, since the distribution of the magnetic flux of the track 33 still remains in the superconductors 4, the levitation moving unit 5 is again levitated and travels in conformity with the advancing direction in the restart.

Accordingly, it is possible to more clearly show the pinning effect by providing the stop/start portion 6.

The other advantages are the same as those of the first embodiment.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What is claimed is:

1. A superconductive magnetic levitation apparatus, comprising:
   a levitation moving unit including at least one superconductor element comprising a superconducting material, a coolant for cooling the at least one superconductor element and a tank for storing the coolant;
   a track arranged in confronted relation with the at least one superconductor element of the levitation moving unit, the track comprising:
      a ferromagnetic metal plate;
      a plurality of permanent magnets fixed to the ferromagnetic metal plate, the plurality of permanent magnets including a plurality of magnetic pieces and including first and second end sections and a plurality of interior sections formed between the first and second end sections;

wherein each of said magnetic pieces of the first and second end sections and interior sections are arranged to have a respective magnetic pole of one polarity adjacent to a respective magnetic pole of an opposite polarity in a transverse direction of the track; and wherein each of said magnetic pieces of the interior sections are arranged to have a respective magnetic pole of one polarity adjacent to a respective magnetic pole of the one polarity in a longitudinal direction of the track, and each of said magnetic pieces of the first and second end sections are arranged to have a respective magnetic pole of one polarity adjacent to a respective magnetic pole of an opposite polarity with an adjacent respective interior section in the longitudinal direction of the track.

2. The superconductive magnetic levitation apparatus according to claim 1, wherein said track comprises at least one curved portion in an up-and-down direction.

3. The superconductive magnetic levitation apparatus according to claim 1, wherein said at least one superconductor element includes a plurality of superconductor elements arranged in the transverse direction of the track.

4. A superconductive magnetic levitation apparatus, comprising:

a levitation moving unit including at least one superconductor element comprising a superconducting material, a coolant for cooling the at least one superconductor element and a tank for storing the coolant;

a track arranged in confronted relation with the at least one superconductor element of the levitation moving unit, the track comprising:
  a ferromagnetic metal plate;
  a plurality of permanent magnets fixed to the ferromagnetic metal plate, the plurality of permanent magnets including a plurality of magnetic pieces and including a plurality of planar trapezoidal sections having straight sides and a plurality of standard sections;

wherein each of said magnetic pieces of the standard sections and trapezoidal sections are arranged to have a respective magnetic pole of the one polarity adjacent to a respective magnetic pole of an opposite polarity in a transverse direction of the track; and wherein each of said magnetic pieces of the standard sections and trapezoidal sections are arranged to have a respective magnetic pole of one polarity adjacent to a respective magnetic pole of the one polarity in a longitudinal direction of the track; and wherein the levitation moving unit travels at the trapezoidal sections with a rear portion swinging due to a pinning effect.

5. The superconductive magnetic levitation apparatus according to claim 4, wherein said track includes at least one loop.

6. The superconductive magnetic levitation apparatus according to claim 4, wherein said track comprises a plurality of loop portions connected by at least one cross portion.

7. The superconductive magnetic levitation apparatus according to claim 6, wherein a portion of said at least one cross portion has a space at each of a plurality of locations in said track omitting any of said plurality of magnetic pieces where one of said plurality of loop portions intersects with one of said plurality of magnetic pieces of an opposite polarity in another of said plurality of loop portions.

8. A superconductive magnetic levitation apparatus, comprising:

a levitation moving unit including at least one superconductor element comprising a superconducting material, a coolant for cooling the at least one superconductor element and a tank for storing the coolant;

a track arranged in confronted relation with the at least one superconductor element of the levitation moving unit, the track comprising:
  a ferromagnetic metal plate;
  a plurality of permanent magnets fixed to the ferromagnetic metal plate;

wherein each of said magnetic pieces are arranged to have a respective magnetic pole of one polarity adjacent to a respective magnetic pole of an opposite polarity in a transverse direction of the track;

wherein each of said magnetic pieces are arranged to have a respective magnetic pole of one polarity adjacent to a respective magnetic pole of the one polarity in a longitudinal direction of the track; and at least one stop/start portion in said track, said at least one stop/start portion comprising a non-magnetic plate provided on the track only at the at least one stop/start portion and a track movable portion having a ferromagnetic metal plate and a plurality of permanent magnets fixed to the ferromagnetic metal plate, the track movable portion being arranged below said non-magnetic plate, said track movable portion being arranged to selectively move toward and away from said non-magnetic plate to selectively frictionally stop said levitation moving unit on said non-magnetic plate by lowering the magnetic flux density at said at least one stop/start portion when said track movable portion is moved away from said non-magnetic plate.

9. The superconductive magnetic leviation apparatus according to claim 8, wherein said at least one stop/start portion comprises a plurality of stop/start portions provided in said track.

10. The superconductive magnetic levitation apparatus according to any one of claims 1, 4 or 8, wherein said tank contains an absorbent for absorbing the coolant.

* * * * *